(12) United States Patent
Uleski (10) Patent No.: US 7,086,412 B2
(45) Date of Patent: Aug. 8, 2006

(54) SNAP-IN GROMMET FOR A VALVE STEAM ASSEMBLY

(75) Inventor: Michael A. Uleski, Roseville, MI (US)

(73) Assignee: Lear Corporation, Southfield, MI (US)

( * ) Notice: Subject to any disclaimer, the term of this patent is extended or adjusted under 35 U.S.C. 154(b) by 348 days.

(21) Appl. No.: 10/692,991

(22) Filed: Oct. 24, 2003

(65) Prior Publication Data

US 2005/0087229 A1 Apr. 28, 2005

(51) Int. Cl.
*F16K 15/20* (2006.01)

(52) U.S. Cl. ........................ 137/223; 152/427
(58) Field of Classification Search ............... 137/223; 73/146, 146.8; 340/442; 152/415, 427
See application file for complete search history.

(56) References Cited

U.S. PATENT DOCUMENTS

| | | | | |
|---|---|---|---|---|
| 2,818,101 A | * | 12/1957 | Boyer | 152/427 |
| 2,968,333 A | * | 1/1961 | Ayres | 152/427 |
| 2,995,168 A | * | 8/1961 | McCord | 152/427 |
| 3,387,488 A | * | 6/1968 | Walker | 73/146.8 |
| 3,407,832 A | * | 10/1968 | Lutz | 137/223 |
| 3,513,885 A | * | 5/1970 | Allen et al. | 137/223 |
| 3,712,326 A | * | 1/1973 | Thacker | 137/223 |
| 3,719,198 A | * | 3/1973 | Wilhelm et al. | 73/146.8 |
| 3,811,459 A | * | 5/1974 | Schmidt | 73/146.8 |
| 4,064,923 A | | 12/1977 | German et al. | |
| 4,157,530 A | | 6/1979 | Merz | |
| 4,163,208 A | | 7/1979 | Merz | |
| 4,310,826 A | | 1/1982 | D'Angiolillo | |
| 4,411,302 A | | 10/1983 | Kuypers | |
| 4,506,695 A | * | 3/1985 | Kuypers | 137/223 |
| 4,564,056 A | * | 1/1986 | Doring | 152/427 |
| 4,742,857 A | | 5/1988 | Gandhi | |
| 4,783,993 A | | 11/1988 | Lothar et al. | |
| 4,816,802 A | | 3/1989 | Doerksen et al. | |
| 5,035,137 A | | 7/1991 | Burkard et al. | |
| 5,063,774 A | | 11/1991 | Burkard et al. | |
| 5,065,134 A | | 11/1991 | Schmid et al. | |

(Continued)

FOREIGN PATENT DOCUMENTS

DE 1871096 U 4/1963

(Continued)

OTHER PUBLICATIONS

Uleski, Michael A., Snap-In Grommet For A Valve Stem Assembly, U.S. Patent Application No. Unknown, Filed Oct. 24, 2003.

(Continued)

*Primary Examiner*—John Rivell
(74) *Attorney, Agent, or Firm*—Brooks Kushman P.C.

(57) ABSTRACT

The present invention includes a snap-in grommet provided for use in a valve stem assembly. The grommet includes a body consisting of a nose section at the body first end, the nose section having a substantially conical shape to provide for insertion of the body into an inflation hole of a wheel rim. The body further contains an annular section at a base of the nose section, the annular section projecting radially from the base of the nose section and a cylindrical section sized to match the inflation hole and having a first end adjoined to the annular section. A flange section projects radially from a cylindrical section second end, and an axial bore passes centrally through the body. A sleeve is located within the grommet body bore, the sleeve having an outer surface configured to match the body bore and having a bore configured to receive a valve stem.

20 Claims, 5 Drawing Sheets

U.S. PATENT DOCUMENTS

| | | |
|---|---|---|
| 5,211,782 A | 5/1993 | Thelen |
| 5,365,967 A | 11/1994 | Moore |
| 5,606,123 A | 2/1997 | Rabizadeh |
| 5,717,135 A | 2/1998 | Fiorletta et al. |
| 5,844,131 A | 12/1998 | Gabelmann et al. |
| 5,958,160 A | 9/1999 | Botte |
| 6,055,855 A | 5/2000 | Straub |
| 6,163,255 A | 12/2000 | Banzhof et al. |
| 6,167,900 B1 | 1/2001 | Laird |
| 6,531,960 B1 | 3/2003 | Gladstone et al. |
| 6,571,818 B1 | 6/2003 | Peach |
| 6,722,409 B1 * | 4/2004 | Martin ................ 152/427 |
| 2002/0168795 A1 | 11/2002 | Schuurmans |
| 2003/0079537 A1 | 5/2003 | Luce |

FOREIGN PATENT DOCUMENTS

| | | | |
|---|---|---|---|
| DE | 3127368 | | 1/1983 |
| DE | 3 407 592 | * | 9/1985 |
| DE | 3906399 | | 9/1990 |
| EP | 1 340 630 | * | 9/2003 |
| FR | 1155139 | | 4/1958 |
| WO | WO 86/04863 | * | 8/1986 |

OTHER PUBLICATIONS

Uleski, Michael A., Tire Monitor System With Spring Retention Clip, U.S. Patent Application No. Unknown, Filed Oct. 24, 2003.

* cited by examiner

SNAP-IN GROMMET FOR A VALVE STEAM ASSEMBLY

BACKGROUND OF THE INVENTION

1. Field of the Invention

The present invention relates to a snap-in grommet for a valve stem assembly tire pressure monitoring system.

2. Background Art

Conventional tire pressure monitoring (TPM) systems for vehicles include a tire pressure sensor that is attached to a rim of a vehicle wheel assembly. In some TPM systems, the tire pressure sensor is contained in a sensor housing that includes an air pressure sensor. The sensor senses the air pressure in a tire of the wheel assembly and transmits a signal to a receiver outside the tire. The sensor housing contains a recess. A nut is positioned inside the recess and is threadably connected to a tire valve stem assembly. The valve stem extends through a tire inflator hole in the wheel rim. The sensor housing and nut provide alignment of the sensor, housing and valve stem.

In other conventional TPM systems, the tire valve assembly is inserted through the outside of the wheel rim into the tire pressure monitoring system. In any case, a portion of the tire valve stem protrudes through the tire inflator hole in the wheel rim to provide for inflation and deflation of the tire.

However, insertion of the valve stem into the tire pressure monitoring system through the outside of the wheel rim can lead to difficulties when trying to align the valve stem with the sensor housing of the tire pressure monitor. Furthermore, abrasions are possible when tightening the valve stem assemblies due to the metal-to-rubber contact between the valve stem and the interior of the conventional tire inflator hole grommet and the outer surface of the grommet and the inflation hole. Further still, electrolytic corrosion can occur since the valve stem and the wheel rim are typically implemented using dissimilar metals.

In addition, in conventional approaches to TPM systems, tire valve assembly air leakage from the tire inflator hole can occur. Some conventional tire pressure monitoring devices use a circumferential line element seal and a tapered seal with a flat-faced flange. Sealing is achieved by compressing the circumferential line element seal against the tire inflator hole and compressing the flange seal against the metal valve stem. However, air leakage can still occur from the tire inflator hole when such conventional approaches are utilized. In particular, over-tightening of a valve stem retaining nut can crush and damage one or more sealing regions and cause air leakage.

Thus, there exists a need and an opportunity for a system and a method to improve TPM valve assemblies. Specifically, such an improved system and method may provide improved sealing at interfaces between components of the TPM valve assembly, and may reduce or eliminate abrasion between components of the TPM valve assembly to further improve sealing.

SUMMARY OF THE INVENTION

The present invention generally provides an improved system (or apparatus) and an improved method for a tire pressure monitor (TPM) valve stem grommet. The present invention generally provides a snap-in grommet having an integral sleeve and at least one sealing interface (and generally provides a plurality of sealing interfaces). Such an improved system and method for a valve stem grommet may provide improved sealing, reduced air leakage, and improved warranty when compared to conventional approaches.

According to the present invention, for use in a valve stem assembly, a snap-in grommet is provided. The grommet comprises a grommet body consisting of a nose section at the first end of the grommet body, the nose section having a substantially conical shape to provide for insertion of the grommet body into an inflation hole of a vehicle wheel rim. The grommet body further includes an annular section at a base of the nose section, the annular section projecting radially outward from the base of the nose section and a cylindrical section sized to match outward from the base of the nose section and a cylindrical section sized to match the inflation hole and having a first end adjoined to the annular section. A flange section projects radially outward from a second end of the cylindrical section, and an axial bore passes centrally through the grommet body. An integral sleeve is located within the grommet body bore, the sleeve having an outer surface configured to match the grommet body bore and having a bore configured to receive a valve stem.

Also according to the present invention, a method of reducing air leakage at a vehicle tire valve stem and grommet assembly is provided. The method comprises inserting a snap-in grommet into an inflation hole in a vehicle wheel rim, wherein the grommet comprises a grommet body. The grommet body has a nose section at a first end of the grommet body, the nose section having a substantially conical shape to provide for insertion of the grommet body into an inflation hole of a vehicle wheel rim. An annular section is located at a base of the nose section, the annular section projecting radially outward from the base of the nose section. A cylindrical section of the grommet body may be sized to match the inflation hole and may have a first end adjoined to the annular section, and a second end from which a flange section projects radially outward. An axial bore passes centrally through the grommet body and an integral sleeve is located within the grommet body bore. The sleeve has an outer surface configured to match the grommet body bore and a bore configured to receive a valve stem. The method further comprises inserting the valve stem through the sleeve bore of the snap-in grommet from an inside of the vehicle wheel rim to an outside of the vehicle wheel rim and tightening a retaining nut assembly onto a threaded portion of the valve stem from the outside of the vehicle wheel rim, wherein the tightening compresses a substantially flat surface of the flange section opposite the first end against a substantially flat surface of a flange of the valve stem.

Further, according to the present invention, a grommet is disclosed for use in a valve stem assembly. The grommet comprises a grommet body comprising: a nose section at a first end of the grommet body, the nose section having a substantially conical shape to provide for insertion of the grommet body into an inflation hole of a vehicle wheel rim, a cylindrical section sized to match the inflation hole having a first end adjoined to the nose section, a flange section that projects radially outward from the surface of the second end of the grommet body, an axial bore passing centrally through the grommet body, and an integral sleeve located within the grommet body bore, the sleeve having an outer surface configured to match the grommet body bore and having a bore configured to receive a valve stem.

The above features, and other features and advantages of the present invention are readily apparent from the following detailed descriptions thereof when taken in connection with the accompanying drawings.

DETAILED DESCRIPTION OF THE PREFERRED EMBODIMENT

The present invention generally provides an improved system (or apparatus) and an improved method for a tire pressure monitor (TPM) valve stem grommet. The present invention generally provides a snap-in grommet having an integral sleeve and at least one sealing interface (and generally provides a plurality of sealing interfaces). Such an improved system and method for a valve stem grommet may provide improved sealing, reduced air leakage, and improved warranty when compared to conventional approaches.

Figures 1, 2:
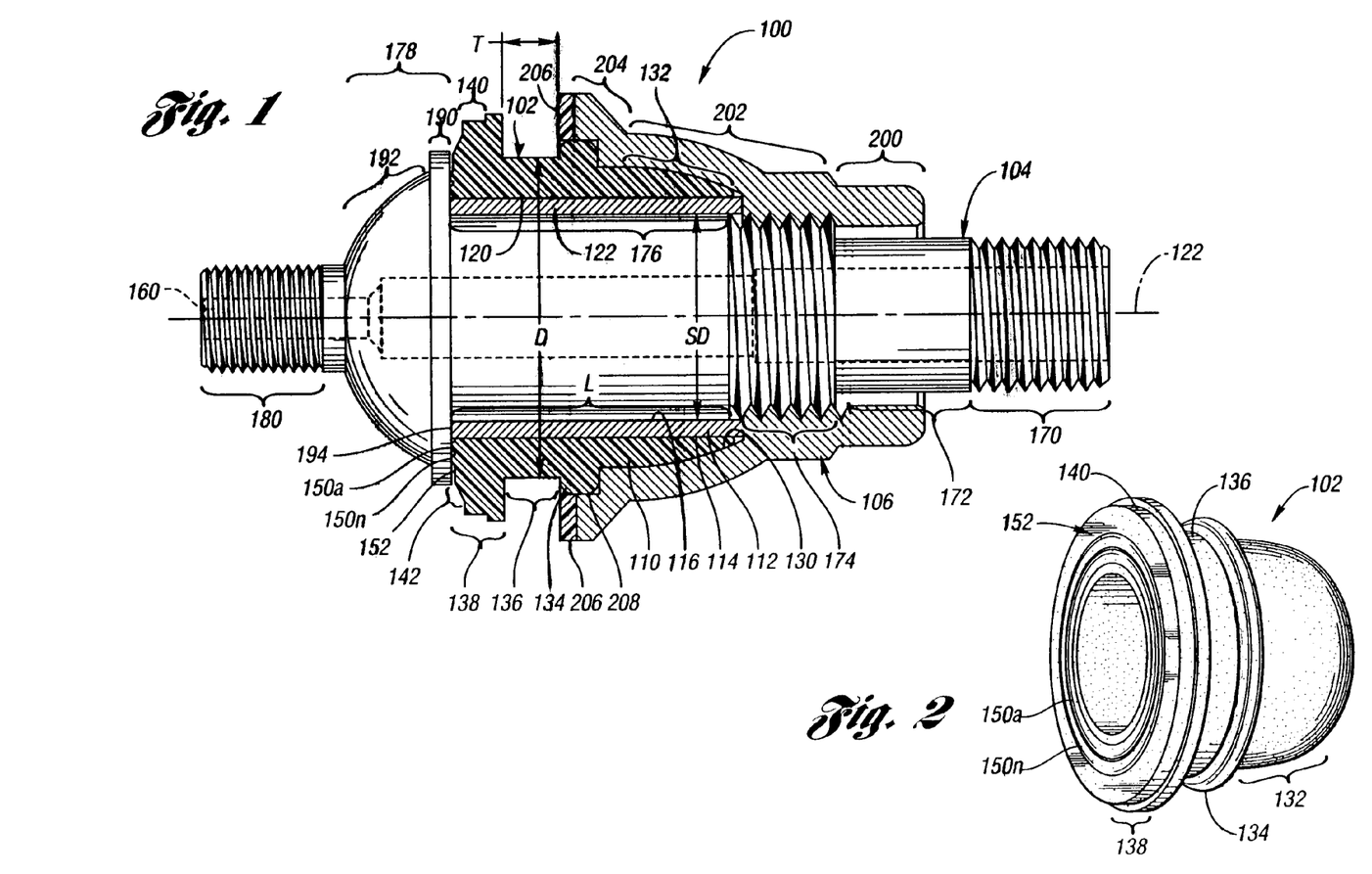
FIG. 1 is a sectional view of a valve stem and grommet assembly of the present invention.
FIG. 2 is a perspective view of a snap-in grommet of the present invention.

Referring to FIG. 1, a diagram illustrating a valve stem and grommet assembly 100 of the present invention is shown. The valve stem and grommet assembly 100 is generally implemented in connection with a vehicle wheel assembly TPM sensor and housing (described in more detail in connection with FIGS. 5 and 6). However, the assembly 100 may be implemented independently of a TPM system.

The assembly 100 generally comprises a grommet 102, a valve stem 104, and a retaining nut assembly 106. The grommet 102 is generally snapped (i.e., inserted, pushed, popped, etc.) into an inflator hole in a wheel rim (described in more detail in connection with FIGS. 4, 5 and 7). The stem 104 is generally inserted through the grommet 102. The retaining nut assembly 106 generally threadably engages the stem 104 and retains the assembly 100 in the wheel rim where the valve stem and grommet assembly 100 is implemented (described in more detail in connection with FIGS. 3 and 8).

In one example, the grommet 102 generally comprises a grommet body 110 and an integral sleeve (i.e., bushing, pipe, tube, etc.) 112. In another example, the grommet 102 may be implemented without the sleeve 112. The grommet body 110 generally comprises a centrally located bore (i.e., through-hole, passage, lumen, etc.) 120 passing through the body 110 and having an axis 122. The bore 120 is generally cylindrically shaped. However, the bore 120 may be configured having any appropriate shape to meet the design criteria of a particular application. The sleeve 112 and the bore 120 generally have substantially the same length (e.g., L).

The sleeve 112 may be cylinder or pipe shaped, and generally has an outer surface 114 that is configured to match the bore 120 of the grommet body 110. The sleeve 112 generally comprises a substantially smooth inner surface (or bore) 116 that may be configured to receive the valve stem 104. In one example, the outer surface 114 may be substantially smooth. In another example (not shown), the outer surface 114 may comprise at least one (generally a plurality of) ridges that may extend in a longitudinal direction relative to the generally cylindrically shaped sleeve 112 (i.e., axially). In yet another example (not shown), the outer surface 114 may be cross-hatched or knurled. When the sleeve 112 is implemented having ridges, cross-hatching, knurling, and the like, rotation of the sleeve 112 relative to the grommet body 110 may be reduced or eliminated.

The sleeve 112 may provide stiffness to the grommet 102 that may aid insertion of the grommet 102 into the inflator hole. The sleeve 112 may also reduce or eliminate abrasions caused during the insertion of the stem 104 into the grommet 102, and the tightening of the retaining nut assembly 106 to the valve stem 104.

In one example, the sleeve 112 may be assembled to the grommet body 110 via insertion of the sleeve 112 into the bore 120. The fit between the sleeve 112 and the bore 120 is generally snug or tight such that rotation between the body 110 and the sleeve 112 is reduced or eliminated. In another example, the grommet body 110 may be over-molded on the sleeve 112.

The grommet body 110 generally comprises a rubber material. In one example, the body 110 may be implemented (i.e., manufactured, produced, etc.) using a synthetic rubber (e.g., Nitrile, buna-n, or the like). However, the grommet body 110 may be manufactured using any appropriate material to meet the design criteria of a particular application. Such design criteria generally includes resistance to chemicals, abrasions, and punctures, and may be described in connection with one or more American Society for Testing and Materials (ASTM) and/or Society of Automotive Engineers (SAE) standards. Such design criteria may provide for higher resistance to chemicals, abrasions and punctures than may be provided by rubbers such as natural rubber, latex and vinyl.

The sleeve 112 is generally implemented using a relatively hard material (e.g., having a Rockwell hardness of B50 or more) when compared to the material that comprises the grommet body 110. In one example, the sleeve 112 may be implemented using a high temperature plastic (e.g., a plastic that generally retains similar physical properties in temperatures having a range of −40° F. through 300° F.). In another example, the sleeve 112 may be implemented using a metal.

The metal implemented as the sleeve 112 may include aluminum, brass, copper, and the like. However, the sleeve 112 may be manufactured using any appropriate material to meet the design criteria of a particular application.

The grommet body 110 generally comprises an outer surface having a shape configured such that the grommet 102 may be easily inserted (i.e., snapped, pushed, popped, etc.) into the inflator hole of the wheel rim where the assembly 100 is implemented. After insertion, the grommet 102 is generally securely (i.e., snugly, tightly, etc.) retained in the rim during wheel handling, TPM assembly, and the like operations. The grommet 102 may also be readily removable for replacement, and may provide an improved sealing between the TPM assembly components and the wheel components.

The body 110 generally has a first end 130. A nose section (i.e., region, portion, area) 132 of the grommet body 110 may have a tapered, substantially (i.e., approximately, about, essentially, etc.) conical shape that may be narrowed at the end 130 to provide easy insertion of the end 130 into the inflator hole. In one example, at the base of the nose region 132 (i.e., at the end of the nose region 132 opposite the first end 130) the grommet body 110 may have a generally (i.e., substantially, approximately, about, essentially, etc.) annular or o-ring shaped section 134. In another example (not shown), the grommet 102 may be implemented without the annular seal 134.

The annular section 134 generally projects radially outward from the surface of the base of the nose region 132. The grommet body 110 generally further comprises a substantially cylindrical section 136 having a diameter (e.g., D) and a length (e.g., T) along the axis 122, a first end that adjoins the annular section 134, and a second end that adjoins a flange section 138. When the grommet 102 is implemented without the annular seal 134, the cylindrical section 136 may be formed as a direct extension of the conical section 132.

The flange section 138 generally forms a second end of the grommet body 110 and projects radially outward from the cylindrical section 136 of the grommet 102. A rearwardly facing surface of the flange section 138 (i.e., facing opposite the first end 130) may comprise a step (i.e., ledge, lip, etc.) 140 that projects radially inward from the section of the flange adjoined to the outer surface of the cylindrical section 136, a chamfer 142 adjoining the step 140, and at least one interface seal 150 (i.e., the interface seals 150a–150n) formed (e.g., molded) on a substantially flat face, rearward facing (or backside) surface 152.

The interface seals 150a–150n may be implemented as annular protrusions (i.e., projections, extensions, etc.) having a generally (i.e., substantially, approximately, about, essentially, etc.) hemispherical (i.e., half o-ring) cross-section. The seals 150 may be generally (i.e., substantially, approximately, about, essentially, etc.) concentric about the axis 122, and may protrude (or project) rearwardly from the backside of the flange 138 off the face 152 as semi-annular rings (i.e., half o-rings).

The valve stem 104 may be of a generally (i.e., substantially, approximately, about, essentially, etc.) cylindrical shape and have a bore 160 that extends through the length of the stem 104. The bore 160 may have a single diameter (not shown) or the bore 160 may have varying diameters along the axis 122 to meet the design criteria of a particular application.

The valve stem 104 generally comprises a metal or a metal alloy. In one example, the stem 104 may be manufactured out of a die-cast Zamac 3 alloy (where Zamac is an alloy that comprises zinc, aluminum, manganese and copper). In another example, the stem 104 may be manufactured out of a die-cast Zamac 5 alloy. However, the valve stem 104 may be implemented via any appropriate material to meet the design criteria of a particular application.

Exposed surfaces of the valve stem 104 such as the outer surface and the bore 160, may be coated or treated with a surface finish that may provide corrosion protection and improved aesthetic appearance when compared to the untreated base material that comprises the unexposed surfaces of the valve stem 104. In one example, the valve stem 104 may be implemented having a satin chrome surface finish. In another example, the stem 104 may be implemented having a bright nickel finish. However, the stem 104 may be implemented having any appropriate finish to meet the design criteria of a particular application.

In one example, the valve stem 104 generally comprises a first threaded portion 170, a tightening portion 172, a second threaded portion 174, a cylindrical portion 176, an interface portion 178, and a third threaded portion 180. The portions 170, 172, 174, 176, 178 and 180 are generally contiguous along the axis 122.

The first threaded portion 170 may be implemented having external threads that may be configured to threadably engage a protective cap (described in connection with FIG. 3). The tightening portion 172 may be implemented having at least one pair of opposing tightening or wrenching flats (not shown) on the external surface. The second threaded portion 174 may be implemented having threads on the external surface that may be configured to threadably engage the retaining nut assembly 106.

The cylindrical portion 176 of valve stem 104 may be implemented having a length that is substantially equal to the length L of the integral sleeve 112, and a diameter SD. The second threaded portion 174 is generally implemented having an outside diameter substantially equal to the diameter SD. The diameter SD is generally selected to be slightly (i.e., in the range of 0.1 mm–0.8 mm) less than the diameter of the bore (i.e., inner surface) 116 of the sleeve 112. In one example (e.g., an implementation of the grommet 102 without a sleeve 112), the bore 120 may be configured to receive the valve stem 104, and the bore 120 may have a diameter that is substantially equal to the diameter SD.

A portion of the bore 160, generally in the regions 170, 172 and 174, may be internally threaded (not shown) to threadably engage a valve (e.g., a Schrader valve) that may be configured to provide inflation, gas retention and deflation of a tire implemented in connection with the valve stem and grommet assembly 100.

The interface section 178 may be implemented having a hat-like shape. The interface portion 178 generally comprises a flange 190 that projects radially outward from the surface of the interface portion 178 (i.e., the brim of the hat-like shape) and a substantially hemispherical or arcuate rearward facing portion 192 (i.e., the crown of the hat-like shape). The flange 190 generally has a diameter that is larger than the diameter of the outmost one of the interface seals 150. The flange 190 is generally substantially flat at a surface 194 that is opposite the hemispherical section 192 (i.e., the bottom of the brim is generally flat).

The third threaded portion 180 may be implemented having external threads that may be configured to threadably engage a retaining (or adjustment) nut (described in connection with FIG. 5) when the valve stem 104 is tightened to a TPM housing assembly.

The retaining nut assembly 106 may be implemented having a hat-like shape. The assembly 106 generally comprises a tightening region 200, a substantially conical section 202 (i.e., the crown of the hat), a flange 204 and a flat seal 206 (i.e., at the brim of the hat). The tightening region 200 may be implemented having external hex (or other appropriately configured) flats that may be configured to engage a wrench when the assembly 106 is tightened to the rim where the assembly 100 is implemented.

The conical section 202 may be internally threaded to threadably engage the second threaded portion 174 of the valve stem 104. The flat seal 206 generally has a diameter substantially equal to a diameter of the flange 204. The seal 206 may be fixed to the flange 204. The flat seal 206 is generally positioned or placed between the flange 204 and the rim of the wheel where the assembly 100 is implemented. The flange 204 may be implemented having an internal recess 208 generally configured as a circumferential groove at the rearward face of the inner surface of the flange 204. The recess 208 may have a substantially cylindrical shape having a depth approximately one-half of the thickness of the annular seal 134 and a diameter substantially equal to the outer diameter of the annular o-ring shaped seal 134. The groove 208 may be configured to receive the seal 134.

Referring to FIG. 2, a diagram illustrating a perspective view of the snap-in grommet 102 is shown.

Figure 3:
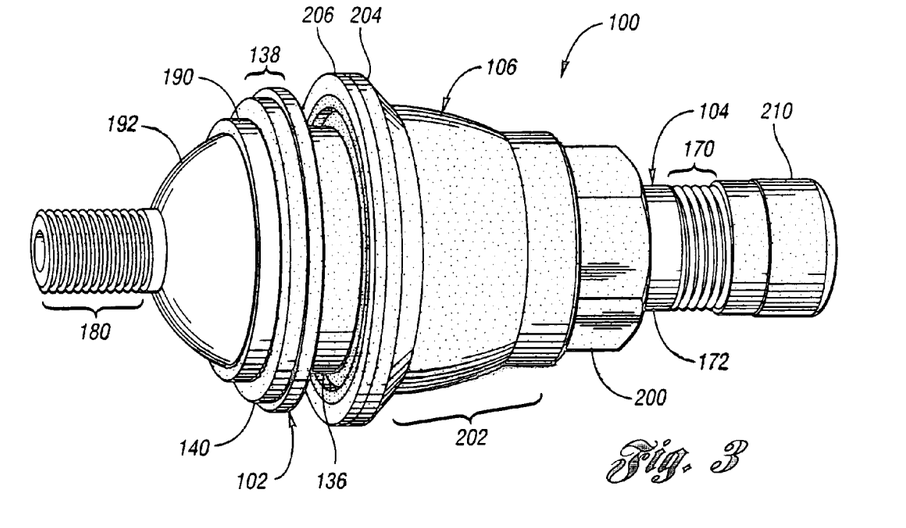
FIG. 3 is a perspective view of the valve stem and grommet assembly of FIG. 1.

Referring to FIG. 3, a diagram illustrating a perspective view of the valve stem and grommet assembly 100 of the present invention is shown. A protective cap 210 is shown on the valve stem 104. The cap 210 may be threadably engaged to the first threaded portion 170 of the valve stem 104.

Figure 4:
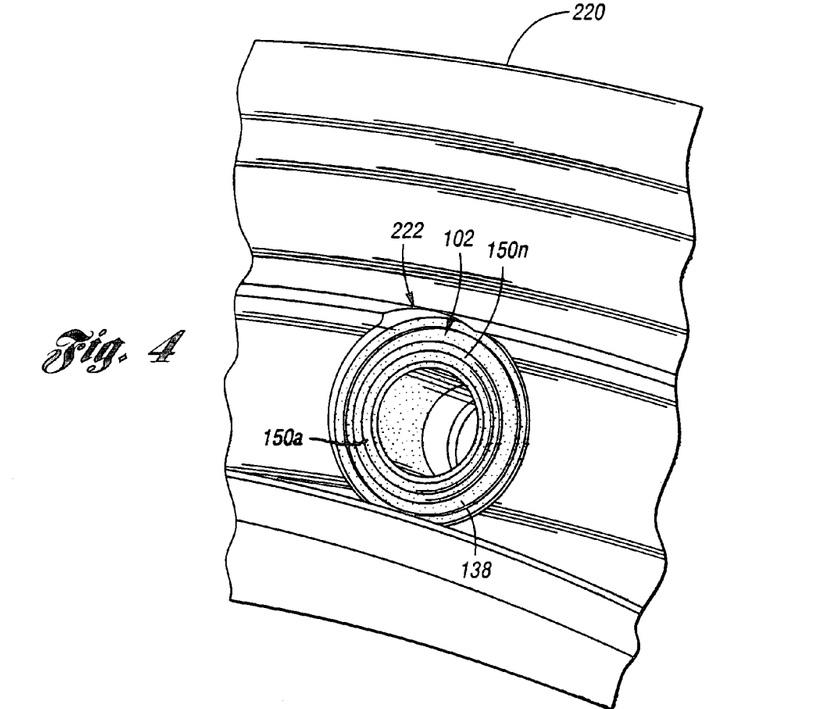
FIG. 4 is a perspective view of the valve stem and grommet assembly of FIG. 1 shown in connection with an inside view of a wheel rim.

Referring to FIG. 4, a diagram illustrating an inside-the-rim perspective view of the grommet 102 of the present invention is shown. The grommet 102 is generally inserted or snapped into an inflation (or inflator) hole (or orifice) 222 in a wheel rim 220. The inflation hole 222 may have a diameter that is approximately (i.e., substantially, about, essentially, etc.) equal to the diameter D of the cylindrical section 136. The diameter (i.e., D) and the length (i.e., T) of the cylindrical section 136 may be configured (i.e., sized) to match the inflation hole 222 such that the grommet 102 snugly fits the orifice 222.

The vehicle wheel rim 220 is generally manufactured using a high strength metal. In one example, the rim 220 may be manufactured using steel. In another example, the rim 220 may be implemented using aluminum. In yet another example, the rim 220 may be manufactured from an alloy such as magnesium alloy or aluminum alloy. However, the rim may be implemented using any appropriate material to meet the design criteria of a particular application.

Figure 5:
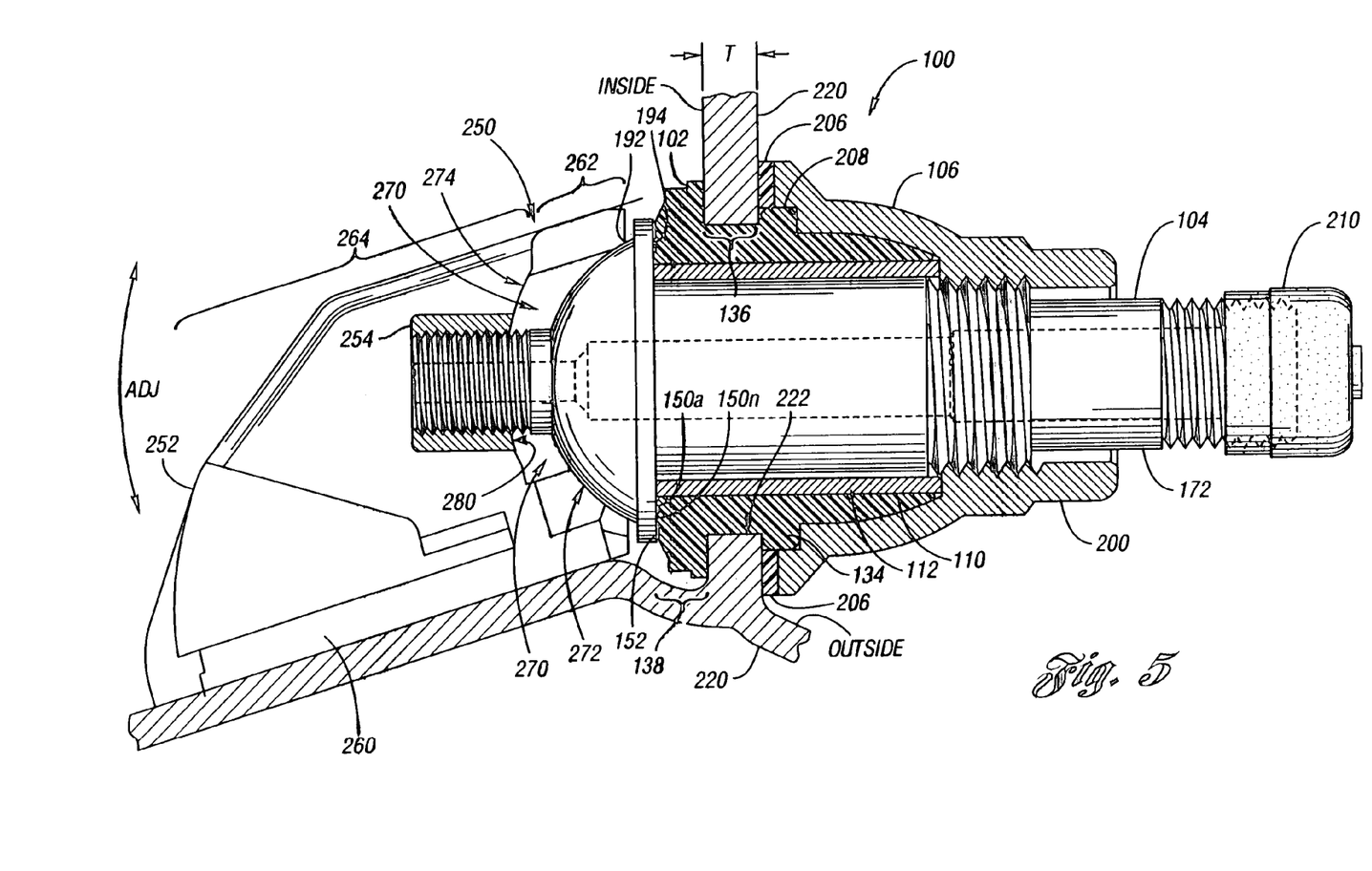
FIG. 5 is a sectional view of the valve stem and grommet assembly of FIG. 1 shown in connection with a tire pressure monitoring system.

Referring to FIG. 5, a sectional diagram illustrating the valve stem and grommet assembly 100 of the present invention in connection with a wheel rim and a TPM assembly is shown. The assembly 100 may be implemented in connection with the wheel rim 220 and a TPM assembly 250. The rim 220 may have a thickness of approximately the thickness T in the region of the inflator hole 222.

The TPM assembly 250 generally comprises a housing 252 and an adjustment nut 254. The TPM housing 252 generally comprises a base 260, an interface wall 262 and a recess (i.e., cavity, cut-out, etc.) 264. The base 260 may be mounted to the rim 220. The nut 254 is generally implemented to provide attachment of the valve stem 104 to the TPM housing 252 (i.e., the third threaded portion 180 of the valve stem 104 generally threadably engages the adjustment nut 254). In one example, the nut 254 may be further configured to provide angular adjustment (e.g., adjustment in an angular arc, ADJ) between the valve stem 104 and the housing 252. In another example (not shown), the valve stem 104 may be implemented having an alternative system (i.e., apparatus, assembly, etc.) and method for retaining the valve stem and grommet assembly 100 and the TPM monitor housing 252 instead of the nut 254. An example of such a system and method may be found in U.S. Patent Publication No. 2005/0087007, which is hereby incorporated by reference in its entirety.

The wall 262 generally comprises a slot 270, a first arcuate (or part-spherical) surface 272 and a second arcuate (or part-spherical) surface 274. The slot 270 may be implemented to provide communication through which the valve stem 104 may be fastened (i.e., joined, fixed, assembled, etc.) to the TPM housing 252. The third threaded portion 180 of the valve stem 104 generally fits loosely in the slot 270 (i.e., clearance between the threads of the portion 180 and the slot 270 may be in a range of 0.05 mm–0.1 mm). The first arcuate (i.e., hemispherical or part-spherical) surface 272 is generally configured to match the outer hemispherical surface 192 of the stem 104.

The adjustment nut 254 is generally substantially cube-shaped, having a face 280 with an arcuate (i.e., hemispherical) surface that is generally configured to match the second arcuate surface 274 of the interface wall 262. The face 280 may be tightened against the second arcuate surface 274 during an installation operation of the valve stem and grommet assembly 100 to the housing 252 on the rim 220.

The sides of the generally cube shaped adjustment nut 254 may be sized such that the adjustment nut 254 is captured loosely in the recess 264 (i.e., clearance between the inner walls of the recess 264 and the faces of the nut 254 may be in a range of 0.05 mm–0.1 mm).

Figure 6:
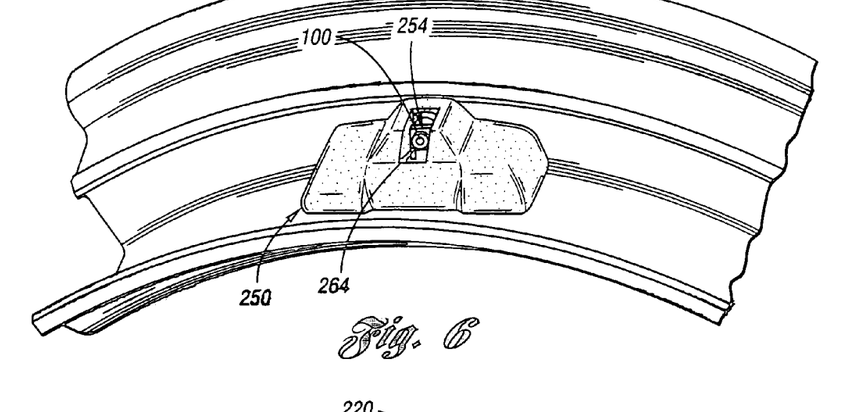
FIG. 6 is a perspective view of the valve stem and grommet assembly of FIG. 1 shown in connection with a tire pressure monitoring system as viewed from the inside of the wheel rim.

Referring to FIG. 6, a diagram illustrating a perspective view of the assembly 100 in connection with the TPM housing 250 installed on the inside of the rim 220 is shown.

Figure 7:
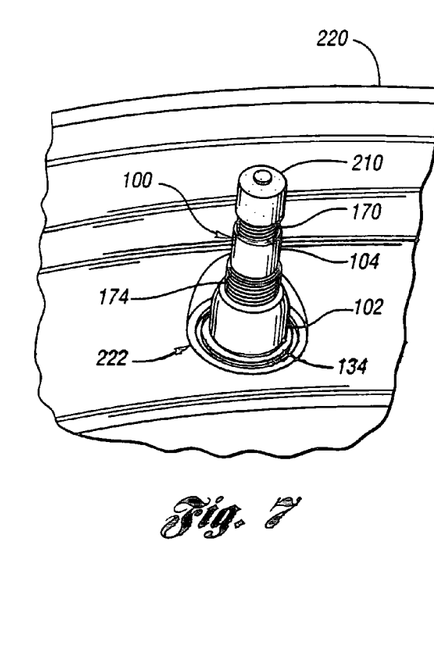
FIG. 7 is a perspective view of the valve stem and grommet assembly of FIG. 1 shown in connection with an outside view of the wheel rim.

Referring to FIG. 7, a diagram illustrating a perspective view of the valve stem and grommet assembly 100 of the present invention as installed in the rim 220 is shown. The assembly 100 is illustrated prior to the installation of the retaining nut assembly 106.

Figure 8:
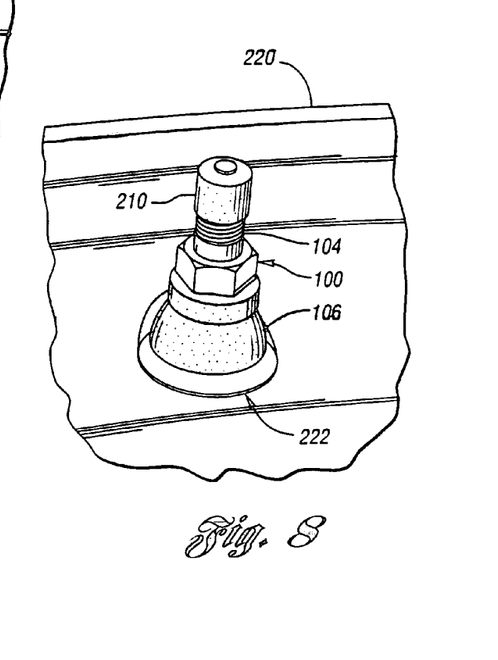
FIG. 8 is a perspective view of the valve stem and grommet assembly of FIG. 1 shown in connection with a retaining nut assembly as viewed from the outside of the wheel rim.

Referring to FIG. 8, a diagram illustrating a perspective view of the assembly 100 of the present invention as installed in the rim 220 after the installation of the retaining nut 106 is shown.

Figure 9:
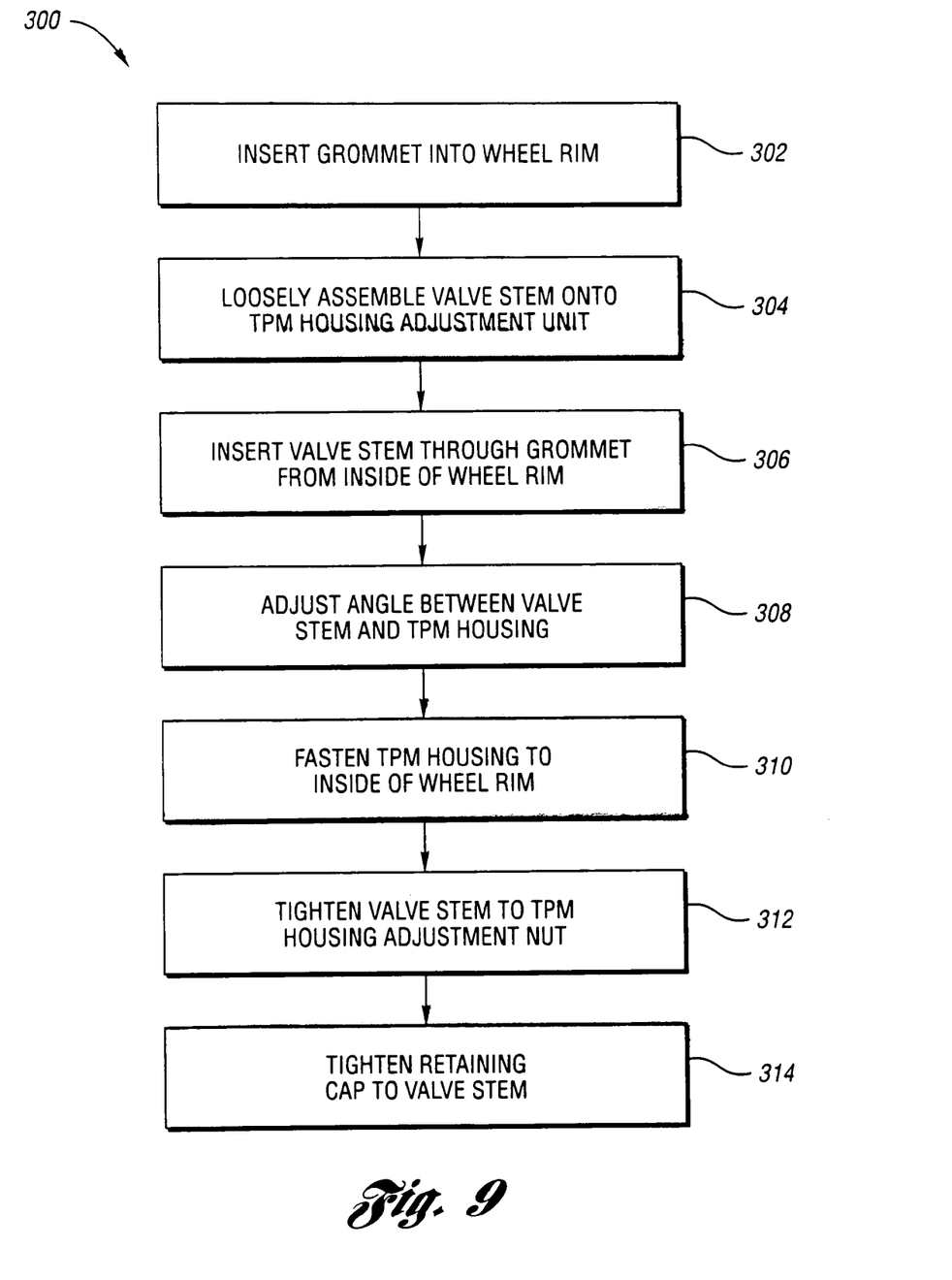
FIG. 9 is a flow chart illustrating a method of assembling the valve stem and grommet assembly of FIG. 1 into a tire pressure monitoring system.

Referring to FIG. 9, a flow chart illustrating a method (i.e., operation, steps, blocks, procedure, etc.) 300 of the present invention is shown. In one example, the method 300 may be implemented in connection with the valve stem and grommet assembly 100 of the present invention. However, the operation 300 may be implemented in connection with any appropriate valve stem and grommet assembly and TPM assembly to meet the design criteria of a particular application.

A grommet (e.g., the grommet 102) may be inserted (i.e., snapped, pushed, popped, etc.) into an inflation hole (e.g., the orifice 222) in a vehicle wheel assembly rim (e.g., the wheel rim 220) (step or block 302). The first end 130 of the grommet 102 may be inserted from the inside of the rim 220 through the inflation hole 222. The nose section 132 is generally inserted through the inflation hole 222. The grommet 102 is generally pushed at the flange section 138 in the direction of the first end 130 until the annular section 134 snaps through the inflation hole 222. The grommet 102 is generally retained (i.e., captured, held, etc.) in the inflation hole 222 by axial or radial (or a combination of both) compression of the annular section 134 and axial or radial (or a combination of both) compression of the flange section 138 while the cylindrical region 136 fits snugly into the inflation hole 222. In one example (e.g., an implementation of the grommet 102 having a sleeve 112), the sleeve 112 may provide stiffness to the grommet 102 that may aid insertion of the grommet 102 in the orifice 222.

In one example, a valve stem (e.g., the valve stem 104) may be loosely threaded into a TPM housing adjustment nut 254 (step or block 304). In another example, the valve stem 104 may be loosely assembled (i.e., coupled, connected, fastened, etc.) to the TPM housing adjustment nut 254. The stem 104 and the housing 252 are generally free to rotate through the adjustment angle ADJ (as shown in FIG. 5).

The valve stem 104 may be inserted from the inside of the wheel rim 220 through the grommet 102 (step or block 306). A portion of the valve stem 104 (e.g., the regions 170, 172 and 174) may protrude (i.e., project, extend, etc.) to the outside through the first end 130 of the grommet 102. The hard, integral sleeve 112 of the present invention may reduce or eliminate abrasion of the inner surface of the grommet as may occur during the insertion of the stem 104 through the grommet 102 with conventional grommets which do not implement the sleeve 112.

The angle ADJ may be adjusted such that the base 260 of the TPM housing 252 is flush with the wheel rim 220 while the axis of the stem 104 remains substantially perpendicular to the outside surface of the rim 220 at the inflation hole 222 (step or block 308). The TPM housing 252 is generally mounted to the wheel rim 220 (step or block 310).

The valve stem 104 may be tightened to the TPM housing adjustment nut 254 (step or block 312). A wrench may be engaged on the tightening or wrenching flats in the tightening portion 172. When the valve stem 104 is tightened, the inner surface of the grommet 102 is generally not twisted and/or abraded by the rotation of the valve stem 104, since the inside of the grommet 102 generally comprises the inner surface 116 of the integral sleeve 112 and the valve stem 104 generally is in contact with the smooth hard surface 116. Because conventional grommets generally do not have a hard, integral sleeve as is implemented in the present invention, twisting and/or abrading can occur when the valve stem is tightened. Such twisting and abrading can cause a leakage path in some conventional approaches.

The retaining nut assembly 106 may be tightened to the valve stem 104 (step or block 314). When the assembly 106 is tightened to the valve stem 104, the grommet 102 may be axially compressed and may expand radially such that sealing may be produced (i.e., generated, formed, etc.) at or on at least one of the following interfaces: the axial and radial interfaces of the annular seal 134 to the recess 208, the interface of the annular seal 134 to the outside surface of the rim 220, the interface of the cylindrical section 136 to the inner surface of the inflation hole 222, the interface of the flange 138 to the inside surface of the rim 220, the interface of the at least one hemispherical seal 150 to the underside 194 of the flange 190, the interface of the surface 152 of the grommet 102 and flat side 194 of the hemispherical portion 178 of the valve stem assembly 104, (in the alternative implementation when the grommet 102 is implemented without a sleeve 112) the interface of the bore 120 of the grommet 102 and the cylindrical portion 176 of the valve stem 104, and/or the interface of the flat seal 206 to the outside surface of the rim 220.

One or more of such sealing interfaces may provide improved and enhanced sealing when compared to conventional approaches. One or more of such sealing interfaces may provide an electrically insulative path between dissimilar metals (e.g., between the valve stem 104 and the rim 220) which may reduce or prevent electrolytic corrosion of the metal components 104 and 220.

The sealing interfaces generated (i.e., formed, produced, etc.) by compression of the at least one seal 150 against the valve stem face surface 194 may provide a more robust seal than sealing provided by the interface of the grommet surface 152 and the valve stem face surface 194.

The bushing 112 in the grommet 102 generally reduces or eliminates friction, wear, and abrasion between the grommet 102 and the valve stem 104 as may occur when the valve stem 104 is inserted through the grommet 102, when the valve stem 104 is loosely assembled to the adjustment nut 254, and when the retaining cap (or nut) 106 is tightened on the valve stem 104.

The sleeve 112 may further provide a structural member that may provide stiffness to the grommet 102 that may aid insertion of grommet 102 through the inflator orifice 122. The length L of the sleeve 112 may be selected (i.e., configured, determined, chosen, etc.) to limit (or control) compression of the grommet 102 and reduce or prevent over-tightening and/or over-compression and crushing of the grommet 102 during the tightening of the retaining nut assembly 106 to the valve stem 104 (i.e., during installation of the valve stem and grommet assembly 100) when compared to conventional grommets that may not provide an element to limit grommet compression and crushing.

As is readily apparent from the foregoing description, the present invention generally provides an improved system (or apparatus) (e.g., the system 100) and an improved method (e.g., the method 300) for a tire pressure monitor (TPM) valve stem grommet (e.g., the grommet 102). The present invention generally provides a snap-in grommet (e.g., the grommet 102) having an integral sleeve (e.g. the sleeve 112) and at least one sealing interface. Such an improved system and method for a valve stem grommet may provide improved sealing, reduced air leakage, and improved warranty when compared to conventional approaches.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. For use with a valve stem assembly, a snap-in grommet, the grommet comprising:
    a grommet body comprising;
        a nose section at a first end of the grommet body, the nose section having a substantially conical shape to provide for insertion of the grommet body into an inflation hole of a vehicle wheel rim;
        an annular section at a base of the nose section, the annular section projecting radially outward from the base of the nose section;
        a cylindrical section sized to match the inflation hole and having a first end adjoined to the annular section;
        a flange section projecting radially outward from a second end of the cylindrical section; and
        an axial bore passing centrally through the grommet body; and
    an integral sleeve located within the grommet body bore, the sleeve having an outer surface configured to match the grommet body bore, and having a bore configured to receive a valve stem;
    wherein the integral sleeve has a length configured to limit compression of the grommet body during installation of a retention nut to the valve stem.

2. The grommet of claim 1 wherein at least one interface seal is formed on a surface of the flange section opposite to the cylindrical section.

3. The grommet of claim 1 wherein the grommet is retained in the inflation hole by compression of the annular section against an outside surface of the wheel rim and compression of the flange section against an inside surface of the wheel rim.

4. The grommet of claim 2 wherein the at least one seal is implemented as a hemispherical projection located concentrically about a center axis of the grommet and configured to interface with a substantially flat surface of a flange of the valve stem.

5. The grommet of claim 1 wherein the integral sleeve is implemented using one of a high temperature plastic, aluminum, brass or copper.

6. The grommet of claim 1 wherein the integral sleeve comprises a separate component inserted into the bore.

7. The snap-in grommet of claim 1 wherein the grommet body is over-molded over the sleeve.

8. The grommet of claim 1 wherein an outer surface of the integral sleeve comprises at least one of at least one ridge extending in a longitudinal direction relative to the sleeve, cross-hatchings and knurling.

9. The grommet of claim 1 wherein the grommet body comprises a synthetic rubber.

10. A method of reducing air leakage at a vehicle tire valve stem and grommet assembly, the method comprising:
   inserting a snap-in grommet into an inflation hole in a vehicle wheel rim, wherein the grommet comprises a grommet body having;
      a nose section at a first end of the grommet body, the nose sectionhaving a substantially conical shape to provide for insertion of the grommet body into an inflation hole of a vehicle wheel rim;
      an annular section at a base of the nose section, the annular section projecting radially outward from the base of the nose section;
      a cylindrical section sized to match the inflation hole and having a first end adjoined to the annular section;
      a flange section projecting radially outward from a second end of the cylindrical section; and
      an axial bore passing centrally through the grommet body; and
      an integral sleeve located within the grommet body bore, the sleeve having an outer surface configured to match the grommet body bore and having a bore configured to receive a valve stem; and
   inserting the valve stem through the sleeve bore of the snap-in grommet from an inside of the vehicle wheel rim to an outside of the vehicle wheel rim; and
   tightening a retaining nut assembly onto a threaded portion of the valve stem from the outside of the vehicle wheel rim, wherein the tightening compresses a substantially flat surface of the flange section opposite the first end against a substantially flat surface of a flange of the valve stem.

11. The method of claim 10 wherein the integral sleeve has a length configured to limit compression of the grommet body during the tightening of the retention nut assembly to the valve stem.

12. The method of claim 10 wherein at least one interface seal is formed on a surface of the flange section opposite to the cylindrical section, the at least one seal implemented as a hemispherical projection located concentrically about a center axis of the grommet and configured to interface with a substantially flat surface of a flange of the valve stem.

13. The method of claim 10 wherein the snap-in grommet is inserted into the inflation hole of the vehicle wheel rim from the inside of the wheel rim, until the annular section of the grommet passes through the outside of the wheel rim.

14. For use with a valve stem assembly, a grommet, the grommet comprising:
   a grommet body comprising:
      a nose section at a first end of the gronxnet body, the nose section having a substantially conical shape to provide for insertion of the grommet body into an inflation hole of a vehicle wheel rim;
      a cylindrical section disposed adjacent to and having a larger diameter than the nose section;
      a flange section that projects radially outward from the surface of the second end of the grommet body and is disnosed adjacent to the cylindrical section;
      an axial bore passing centrally through the grommet body; and
   an integral sleeve located within the grommet body bore, the sleeve having an outer surface configured to match the grommet body bore and a bore configured to receive a valve stem.

15. The grommet of claim 14 wherein the integral sleeve has a length configured to limit compression of the grommet body during installation of a retention nut to the valve stem.

16. The grommet of claim 14 wherein the grommet is retained in the inflation hole by compression of the flange section against an inside surface of the wheel rim.

17. The grommet of claim 14 wherein at least one interface seal is formed on a surface of the flange section opposite to the cylindrical section, the at least one seal implemented as a hemispherical projection located concentrically about a center axis of the grommet and configured to interface with a substantially flat surface of a flange of the valve stem.

18. The grommet of claim 14 wherein the integral sleeve is implemented using one of a high temperature plastic, aluminum, brass or copper.

19. The grommet of claim 14 wherein the integral sleeve comprises a separate component inserted into the bore.

20. The snap-in grommet of claim 14 wherein the grommet body is over-molded over the sleeve.

* * * * *

UNITED STATES PATENT AND TRADEMARK OFFICE
CERTIFICATE OF CORRECTION

PATENT NO. : 7,086,412 B2  Page 1 of 1
APPLICATION NO. : 10/692991
DATED : August 8, 2006
INVENTOR(S) : Michael A. Uleski It is certified that error appears in the above-identified patent and that said Letters Patent is hereby corrected as shown below:

On the Title page, item [54]
Title should read:

SNAP-IN GROMMET FOR A VALVE STEM ASSEMBLY

Column 11, Line 23, Claim 10:

Delete "sectionhaving" and insert therefor -- section having --.

Signed and Sealed this

Nineteenth Day of December, 2006

JON W. DUDAS
*Director of the United States Patent and Trademark Office*